United States Patent [19]

Sumikawa et al.

[11] 4,385,654
[45] May 31, 1983

[54] TWO MAIN GROOVE-RIB TYPE TREAD PATTERN

[75] Inventors: Yasushi Sumikawa, Hoya; Hisao Seitoh, Higashiyamato; Masahiro Kuroda, Higashimurayama, all of Japan

[73] Assignee: Bridgestone Tire Company Limited, Tokyo, Japan

[21] Appl. No.: 341,729

[22] Filed: Jan. 22, 1982

[30] Foreign Application Priority Data

Feb. 3, 1981 [JP] Japan ................................ 56/13744

[51] Int. Cl.³ .............................................. B60C 11/06
[52] U.S. Cl. ............................................... 152/209 R
[58] Field of Search ...................... 152/209 R, 209 D; D12/141, 142

[56] References Cited

U.S. PATENT DOCUMENTS 3,586,086 6/1971 Boileau ........................... 152/209 R Primary Examiner—Michael W. Ball
Attorney, Agent, or Firm—Sughrue, Mion, Zinn, Macpeak, and Seas

[57] ABSTRACT

A tread pattern of two main groove-rib type provided with auxiliary grooves having excellent stone-biting resistance and stone-expelling property is disclosed. In the tread pattern, a pair of main grooves are disposed near both side edges of the tread along these edges and one or two pairs of auxiliary grooves are oppositely arranged between the main grooves, wherein the bottom of the auxiliary groove is directed to the center of the tire in such a manner that the center line in radial section of the auxiliary groove is inclined at an angle of 5°–20° with respect to a normal line of the tread drawn from an intersection of the center line and the tread.

2 Claims, 6 Drawing Figures

TWO MAIN GROOVE-RIB TYPE TREAD PATTERN

BACKGROUND OF INVENTION

This invention relates to a tread pattern of the two main groove-rib type provided with auxiliary grooves having excellent stone-biting resistance and stone-expelling property.

In pneumatic tires, particularly heavy duty tires for use in heavy vehicles such as truck and bus, there are usually tread patterns of so-called two main groove-rib type wherein a pair of main grooves are formed in the tread near both side edges thereof along these edges. In addition tread patterns of four main groove-rib type exist wherein a tread width is substantially divided into five equal parts by four grooves each extending circumferentially about the tread. In this case, the two main groove-rib type tread pattern is advantageous in wear resistance and rib-tear resistance, but becomes disadvantageous in wet skid resistance, heat generation and heat dissipation as compared with the four main groove-rib type tread pattern.

In the two main groove-rib type tread pattern, therefore, there has been attempted a countermeasure such that fine grooves each having a width narrower than that of the main groove are arranged in the central region of the tread portion. In this case, however, a phenomenon inherent to the tire of the above mentioned type results, i.e. pebble stones scattered on road surface enter into the fine groove during the running of the tire. As a result, the pebble stone is frequently pushed away to the bottom of the fine groove during running of the tire, which finally results in damage of the tire casing or bursting of the tire as a worst case. But, if it is intended to expel pebble stones from the fine groove by making the opening width or angle of the fine groove large, there is a strong tendency of producing the disadvantages mentioned in the four main groove-rib type tread pattern, so that the advantages for the two main groove-rib type tread pattern cannot be given sufficiently.

In this connection, there have hitherto been proposed various countermeasures as shown in FIGS. 1–3, wherein a profile of a fine groove G in radial section of tire T is made sinuous or shelf-like protrusions are formed on the groove wall at different levels. In such countermeasures, it is hard to push away pebble stones constrained in the fine groove to the groove bottom, but it is also difficult to expel the pebble stone from the inside of the fine groove. Therefore, it has been confirmed that these countermeasures cannot basically solve the problem of producing damage of the groove bottom.

SUMMARY OF INVENTION

The inventors have made various studies with respect to the arrangement of auxiliary grooves corresponding to the fine grooves which resists stone-biting and easily performs stone-expelling and as a result the invention has been accomplished. That is, the invention advantageously promotes the merits of the two main groove-rib type tread pattern against tread wear and rib tear and effectively improves wet skid resistance, heat generation and heat dissipation by arranging auxiliary grooves in the central region of the tire tread to reduce the stone-biting and make stone-expelling easy.

According to the invention, there is the provision of a tread pattern of two main groove-rib type provided with auxiliary grooves having excellent stone-biting resistance and stone-expelling property in which a pair of said main grooves each having a depth of not less than 10 mm are disposed near both side edges of the tire tread along these edges and one or two pairs of said auxiliary grooves each having a depth of not less than 10 mm and a width narrower than that of said main groove are oppositely arranged between said main grooves at the inside thereof. The bottom of said auxiliary groove is directed to the center of the tire in such a manner that the center line in radial section of said auxiliary groove is inclined at an angle of 5°–20° with respect to a normal line of said tread drawn from an intersection of said center line and said tread.

According to the invention, it is preferable that the width of the main groove is not less than 5% of the width of the tread, preferably 8 to 25 mm and the width of the auxiliary groove is not more than 3.5% of the width of the tread, preferably not more than 7 mm. Moreover, the dimensions and angle for the main and auxiliary grooves are values measured when the tire is inflated under a normal internal pressure, and particularly the groove width is measured in a direction perpendicular to the groove wall at the tread surface or at a center of bending region in case of the zigzag groove.

Further, it is preferable that a pair of auxiliary grooves are oppositely arranged between the two main grooves at the inside thereof. Particularly, it is advantageous that, when the tread width is L, the auxiliary grooves are arranged in a region ranging from $\frac{1}{4}L$ to $\frac{3}{4}L$ with respect to the one side edge of the tread in order to improve heat dissipation at the central region of the tread portion.

When the opening width of the auxiliary groove exceeds 7 mm, there is a potential problem of reducing the wear resistance inherent to the two main groove-rib type tread pattern. On the other hand, when the depth of the auxiliary groove is less than 10 mm, the heat dissipation deteriorates and also the wet skid resistance cannot be ensured to the last stage of wear life.

According to the invention, the center line in radial section of the auxiliary groove is inclined at an angle of 5°–20° with respect to a normal line drawn from an intersection of the center line and the tread, so that not only it is hard for pebble stones scattered on road surface to enter into the auxiliary groove at the ground contact state, but also it is easy to expel a pebble stone from the auxiliary groove under an influence of strong resisting force from the groove wall. As a result, the stone-biting resistance and stone-expelling property are excellent. When the inclination angle is smaller than 5°, the above mentioned effects cannot sufficiently be achieved, while when the inclination angle exceeds 20°, there are caused various fears such as groove bottom cracking, uneven wear of rib, rib tear and the like. That is, it is necessary to limit the inclination angle to the above defined range.

Moreover, it is preferable that an opening angle ($\alpha$) of the main groove is not less than 17° and an opening angle ($\beta$) of the auxiliary groove is not more than 14°.

BRIEF DESCRIPTION OF THE DRAWING

The invention will now be described in detail with reference to the accompanying drawings, wherein.

DESCRIPTION OF THE PREFERRED EMBODIMENT

Figure 1:
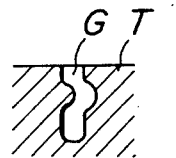
FIGS. 1–3 are partial sectional views of various fine grooves applied to the conventional two main groove-rib type tread pattern, respectively.
Figure 2:
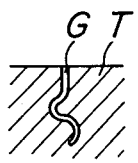
Figure 3:
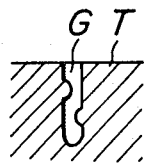
Figure 4:
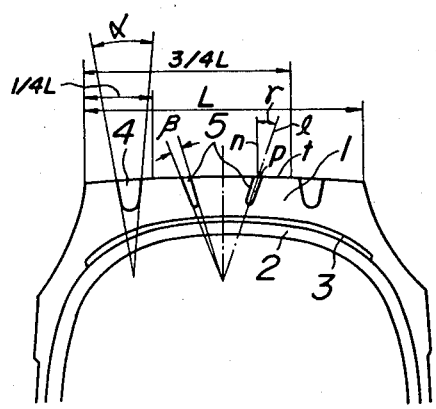
FIG. 4 is a part diagrammatic sectional view of an embodiment of the tire using the two main groove-rib type tread pattern according to the invention.

In FIG. 4 is shown a radial section of the pneumatic bias tire according to the invention having a tire size of 10.00-20 14PR, wherein numeral 1 is a tread portion, numeral 2 is a carcass, and numeral 3 is a breaker. In the tread portion 1 are arranged a pair of main grooves 4 and a pair of auxiliary grooves 5. In this embodiment, the tread width L is 200 mm, both the depth and width of the main groove 4 are 15 mm, and the depth and width of the auxiliary groove 5 are 15 mm and 5 mm, respectively.

Figure 5:
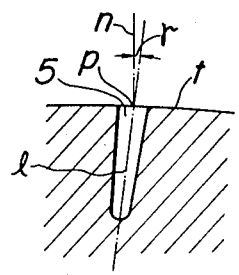
FIG. 5 is an enlarged sectional view of an embodiment of the auxiliary groove according to the invention.

These main and auxiliary grooves have an outline such that they are opened outward from the tread portion 1, wherein the opening angle $\alpha$ of the main groove 4 is 24° and the opening angle $\beta$ of the auxiliary groove 5 is 10°. As enlargedly shown in FIG. 5, an angle between a center line l dividing the profile of the groove into halves and a normal line n of a tread outline t drawn from an intersection p of the center line l and the tread outline t, or an inclination angle $\gamma$ of the auxiliary groove 5 is 8°, which is within a range of 5° to 20°.

Moreover, the inclination angle of the main groove 4 may be about 0°. In this connection, the opening angle $\alpha$ of the main groove 4 is as relatively large as the order of 24°, so that it is not necessary to incline the main groove at a certain angle, which is different from the case aiming at the prevention of stone-biting by the auxiliary groove. If the main groove is inclined at a given angle, disadvantages result in another aspect, i.e. groove bottom cracking is liable to occur, and the like.

In the tire shown in FIG. 4, a pair of auxiliary grooves 5 are arranged at positions of 2/5L and 3/5L with respect to the width L of the tread portion 1. Test tires are then manufactured by varying the inclination anlge $\gamma$ of the auxiliary groove 5, each of which is mounted on a truck. Thereafter, the stone-biting number is counted after the truck is run on a gravelled road and subsequently the stone-expelling number is counted after the truck is run on a paved road. In this way, the influence of the inclination angle $\gamma$ on the stone-biting ratio and stone-expelling ratio is examined by an index on the basis that the data at $\gamma=0°$ are 100 to obtain a result as shown in FIG. 6.

Figure 6:
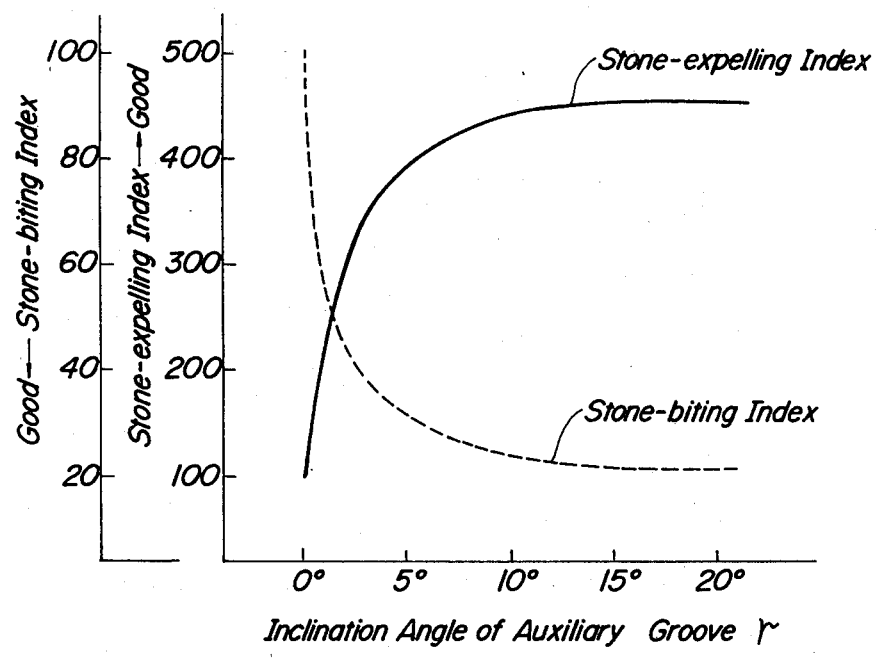
FIG. 6 is a graph illustrating a relationship of the inclination angle of the auxiliary groove to the stone-biting index and stone-expelling index.

As apparent from the result of FIG. 6, when the inclination angle $\gamma$ is not less than 5°, the stone-biting ratio reduces and the stone-expelling ratio becomes considerably higher. The best effect is obtained when the inclination angle is not less than 14°. However, when the inclintion angle is more than 20°, the improvement of the effect is not significant, and rather the fear of injuring the rigidity of the tread at that side which is sharp in the groove edge becomes strong. This fact shows that the inclination angle $\gamma$ is necessary to be within a range of 5° to 20°.

According to the invention, the wet skid resistance, heat generation and heat dissipation can advantageously be improved by such an arrangement of the auxiliary groove that it is hard to bite pebble stones into the groove and it is easy to expel pebble stones from the groove.

What is claimed is:

1. A tread pattern comprising; a two main groove-rib type provided with auxiliary grooves, said pair of said main grooves each having a depth of not less than 10 mm and disposed near both side edges of the tire tread along these edges at an inclination angle of about 0°, one to two pairs of said auxiliary grooves each having a depth of not less than 10 mm and a width narrower than that of said main grooves oppositely arranged between said main grooves at the inside thereof; the bottom of each said auxiliary groove directed to the center of the tire in such a manner that the center line in radial section of said auxiliary groove is inclined at an angle of 5°–20° with respect to a normal line of said tread drawn from an intersection of said center line and said tread, and a pair of said auxiliary grooves oppositely arranged in a region ranging from ¼L to ¾L with respect to the one side edge of said tread when the width of said tread is L, said main groove having a width corresponding to not less than 5% of the width of said tread and an opening angle of not less than 17° and; said each of said auxiliary grooves has a width corresponding to not more than 3.5% of the width of said tread and an opening angle of not more than 14°.

2. A tread pattern according to claim 1, wherein said main groove has a width of 8–25 mm and said auxiliary groove has a width of not more than 7 mm.

* * * * *